(12) United States Patent
Okada et al.

(10) Patent No.: US 7,873,116 B2
(45) Date of Patent: Jan. 18, 2011

(54) TRANSMITTER

(75) Inventors: Takashi Okada, Kodaira (JP); Tatsuya Abe, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 873 days.

(21) Appl. No.: 11/797,025

(22) Filed: Apr. 30, 2007

(65) Prior Publication Data
US 2007/0201582 A1 Aug. 30, 2007

Related U.S. Application Data

(63) Continuation-in-part of application No. PCT/JP2005/020048, filed on Oct. 26, 2005.

(30) Foreign Application Priority Data

| Nov. 1, 2004 | (JP) | ............................ 2004-317940 |
| Mar. 30, 2005 | (JP) | ............................ 2005-097073 |

(51) Int. Cl.
*H04L 27/00* (2006.01)
*H04L 25/03* (2006.01)
*H04L 27/28* (2006.01)

(52) U.S. Cl. ...................................... 375/295; 375/260

(58) Field of Classification Search ................ 375/260, 375/261, 271, 295, 296, 297, 302; 455/63.1, 455/67.13, 91, 103, 110, 114.2, 114.3, 115.1
See application file for complete search history.

(56) References Cited

U.S. PATENT DOCUMENTS

| 6,931,239 B2 * | 8/2005 | Hongo et al. ............... 375/296 |
| 7,489,907 B2 * | 2/2009 | Hasegawa et al. ......... 455/114.3 |
| 7,529,316 B2 * | 5/2009 | Hasegawa et al. ............ 375/296 |
| 2002/0065095 A1 | 5/2002 | Kobayashi et al. |
| 2002/0105947 A1 | 8/2002 | Kitagawa et al. |
| 2003/0012292 A1 * | 1/2003 | Hunton ........................ 375/295 |

(Continued)

FOREIGN PATENT DOCUMENTS

JP 2001-339361 12/2001

(Continued)

OTHER PUBLICATIONS

Notification of Reason for Refusal (with English translation) issued Sep. 15, 2009 in corresponding Japanese Patent Application No. 2006-542379.

*Primary Examiner*—Betsy L Deppe
(74) *Attorney, Agent, or Firm*—Wenderoth, Lind & Ponack, L.L.P.

(57) ABSTRACT

A transmitter is provided which effectively reduces a peak that occurs in transmitting signal electric power. A baseband limiter applies a peak reduction process to digital signals on a plurality of carriers in a baseband. A band limiting filter applies a band limitation process to the digital signal on each of the carriers to which the peak reduction process is applied. Quadrature modulation processing is applied to the digital signal on each of the carriers to which the band limitation process is applied. The digital signals on the carriers to which the quadrature modulation process is applied are added. An intermediate frequency limiter multiplies a signal of the added result by a window function that is weighted depending on the magnitude of the detected peak, and applies a peak reduction process thereto.

3 Claims, 11 Drawing Sheets

U.S. PATENT DOCUMENTS

| | | | |
|---|---|---|---|
| 2003/0026351 A1* | 2/2003 | Hunton | 375/295 |
| 2004/0090283 A1 | 5/2004 | Naito | |
| 2005/0100108 A1* | 5/2005 | Yun et al. | 375/260 |
| 2006/0046764 A1* | 3/2006 | Ohba et al. | 455/522 |
| 2006/0133524 A1* | 6/2006 | Hamada et al. | 375/260 |

FOREIGN PATENT DOCUMENTS

| | | |
|---|---|---|
| JP | 2002-164799 | 6/2002 |
| JP | 2004-104162 | 4/2004 |
| JP | 2004-128923 | 4/2004 |
| JP | 2004-166245 | 6/2004 |
| WO | WO 2004038973 A1 * | 5/2004 |

* cited by examiner

TRANSMITTER

This application is a Continuation-in-Part of International Application Ser. No. PCT/JP2005/020048 filed on Oct. 26, 2005.

TECHNICAL FIELD

The present invention relates to a transmitter for use in a mobile communication system and the like, particularly to a transmitter which effectively reduces peak electric power that occurs in a transmitting signal.

BACKGROUND ART

For example, in a transmitter for a mobile communication system which adopts the code division multiple access communication (CDMA: Code Division Multiple Access) mode and the like for radio communications, a signal to be a transmission target (transmitting signal) is processed by a digital modulating part.

FIG. 6 shows an exemplary configuration of a transmitting amplifier.

In a digital modulating part 51 in this example, signals on a plurality of n of carriers are inputted to a baseband limiter (BB limiter) 61, the signals on the carriers outputted from the BB limiter 61 pass through band limiting filters F1 to Fn, up filters (Up filters) G1 to Gn and digital quadrature modulating parts H1 to Hn, they are added by an adder 62, and the added result is outputted.

In the subsequent stage of the digital modulating part 51, a D/A (Digital to Analog) converter 71, a frequency converting part 72, and a power amplifier (PA: Power Amplifier) 73 are provided. The output signal from the adder 62 passes therethrough for output. In this manner, the peak factor of the transmitting signal is made small, whereby the range of the amplifiable level of the power amplifier is compressed to intend power saving as well as the reproduction of the inverse characteristic of distortion is made easier in distortion compensation of a pre-distortion mode.

In addition, such a transmitter is known in which for an intermediate frequency signal after each carrier synthesis (that is, the output signal of the adder 12), a window function is multiplied around a peak to suppress the peak (for example, see Patent Reference 2).

Patent Reference 1: JP-A-2004-166245
Patent Reference 2: JP-A-2005-20505

DISCLOSURE OF THE INVENTION

However, in the transmitting amplifier (the combination of a transmitter and an amplifier part) as shown in FIG. 6, the peak electric power is reduced for the input signal in the baseband. However, a problem arises that peak electric power is restored when band limitation (waveform shaping) is performed by the band limiting filters F1 to Fn and the like positioned in the subsequent stage thereof.

In addition, in the technique described in Patent Reference 2, when a plurality of peaks exists at positions close to each other (closer time instants) in transmitting signals, a peak suppression coefficient generated due to one of the peaks is overlapped with a peak suppression coefficient generated due to the other of the peaks to excessively reduce the level of the transmitting signal, causing a problem that a baseband symbol to be transmitted is shifted from its original position to degrade EVM (Error Vector Magnitude). Particularly, in signal transmission adapting the CDMA mode, a problem arises that PCDE (Peak Code Domain Error) is degraded as well.

Moreover, due to the influence that the level of a transmitting signal is excessively reduced around the peak to decrease the average electric power, a problem arises that the reduction effect of PAPR (Peak to Average Power Ratio) that is obtained by suppressing only peak electric power is cancelled and the electric power efficiency of a power amplifier cannot be improved effectively.

The invention has been made in view of the circumstances before. An object is to provide a transmitter which effectively performs both the suppression of the peak level and a reduction in out-of-band power leakage of transmitting signals.

In order to achieve the object, in a transmitter according to the invention, a signal to be a transmission target (transmitting signal) is processed as below.

In other words, a baseband limiter means applies a peak reduction process to digital signals to be a transmission target on a plurality of carriers in a baseband. A band limiting filter means applies a band limitation process to the digital signals on each of the carriers to which the peak reduction process is applied by the baseband limiter means. A quadrature modulation processing means applies a quadrature modulation process to the digital signals on each of the carriers to which the band limitation process is applied by the band limiting filter means. An adding means adds the digital signals on each of the carriers to which the quadrature modulation process is applied by the quadrature modulation processing means. An intermediate frequency limiter means applies a peak reduction process to the signal that is the added result by the adding means in the intermediate frequency band.

Therefore, since the peak reduction process is applied in the baseband as well as the peak reduction process is applied in the intermediate frequency band, for example, even in the case in which a peak is restored due to the band limitation (waveform generation) process performed in the subsequent stage of the peak reduction process in the baseband, the peak can be reduced in the intermediate frequency band. Thus, the peak that occurs in the transmitting signal can be effectively reduced, and communication quality can be made excellent.

Here, for the signal to be a transmission target, various signals may be used.

In addition, the number of a plurality of carriers, various numbers may be used. Moreover, such a configuration may be formed in which process steps similar to the invention are used to process a signal to which spread code multiplexing is applied on a single carrier.

In addition, for the peak reduction process performed by the baseband limiter means, the band limitation process performed by the band limitation filter means, the quadrature modulation process performed by the quadrature modulation processing means, and the peak reduction process performed by the intermediate frequency limiter means, processes in various forms may be performed.

In addition, for the quadrature modulation mode, various modes may be used. For example, QPSK (Quadrature Phase Shift Keying) mode and the like may be used.

In addition, for example, the band limiting filter means and the quadrature modulation processing means may be provided for each carrier.

In addition, for example, between the band limiting filter means and the quadrature modulation processing means, an upsampling means may be provided which upsamples the digital signals on each of the carriers to a predetermined sampling rate.

In a transmitter according to the invention, as an exemplary configuration, the intermediate frequency limiter means performs the following process steps.

In other words, a peak detecting means detects the peak of the level of an input signal. A peak relating value generating means generates a value obtained by dividing the difference between the level of the peak detected by the peak detecting means and a predetermined threshold by the level of the peak, or its correction value (as a peak relating value) A level reduction coefficient generating means generates a coefficient for generating a level reduction signal based on the value generated by the peak relating value generating means and a predetermined window function. A level reduction signal generating means generates the result obtained by multiplying the coefficient generated by the level reduction coefficient generating means by the input signal as the level reduction signal. A level reduction signal subtraction means subtracts the level reduction signal generated by the level reduction signal generating means from the input signal to form the subtracted result as an output signal.

Therefore, a window multiplication type intermediate frequency limiter means can be used to effectively reduce the peak level.

Moreover, for modes of the limiter, there are a level fluctuation mode, a phase fluctuation mode, a window multiplication mode and so on, various modes may be used. For example, it was confirmed by experiment that when a limiter according to a window multiplication mode using a Kaiser window is used as an intermediate frequency limiter means, the characteristics of a peak electric power to the average electric power ratio (PAPR: Peak to Average Power Ratio) and the adjacent channel leakage power ratio (ACLR: Adjacent Channel Leakage power Ratio) can be particularly made excellent.

Here, for the level of the signal, for example, various levels such as electric power and voltage may be used.

In addition, for the peak of the level of the signal, for example, the highest level in a predetermined range is used. In addition, only a single peak may be used, or a plurality of peaks may be used.

In addition, for a predetermined threshold, various values may be used.

In addition, for the correction value of the value (here, referred to as an original value) obtained by dividing the difference between the level of the peak and a predetermined threshold by the level of the peak, for example, a resulted value obtained by multiplying the original value by a predetermined coefficient may be used.

In a transmitter according to the invention, as an example, a limiter means is provided with the following means:

a peak detecting means operable to compare a transmission target signal level threshold with the level of a transmission target signal to detect the peak of a transmission target signal;

a peak suppression ratio generating means operable to generate a peak suppression ratio in accordance with the transmission target signal level threshold and the level of the peak detected by the peak detecting means;

a peak suppression ratio correcting means operable to correct the peak suppression ratio generated by the peak suppression ratio generating means depending on a degree with which a peak suppression coefficient that has been generated in the past is overlapped with a peak suppression coefficient that is newly generated;

a peak suppression coefficient generating means operable to generate a result obtained by weighting the corrected peak suppression ratio corrected by the peak suppression ratio correcting means by a predetermined window function as a peak suppression coefficient; and a transmission target signal level suppression means operable to suppress the level of a transmission target signal by one to a plurality of peak power suppression coefficients generated by the peak suppression coefficient generating means (for example, a limiter coefficient computing part 38 and multipliers 39A and 39B).

BEST MODE FOR CARRYING OUT THE INVENTION

Embodiments according to the invention will be described with reference to the drawings.

Embodiment 1

A first embodiment of the invention will be described.

Figure 1:
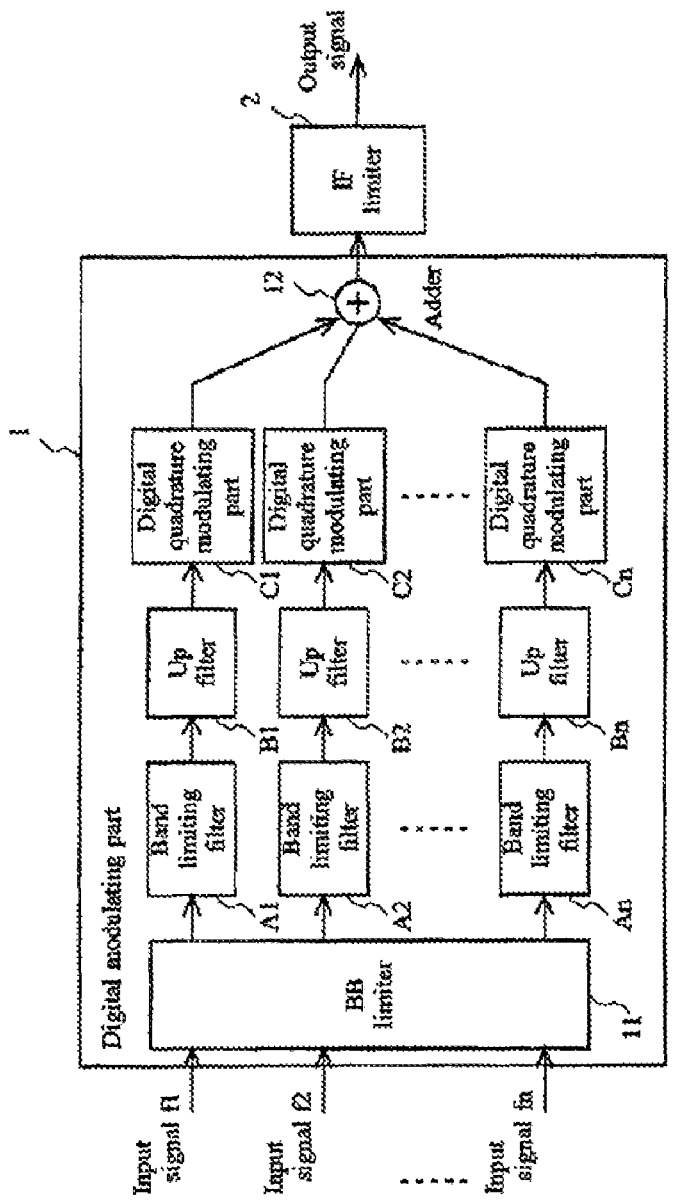
FIG. 1 shows a diagram depicting an exemplary configuration of a transmitter according to a first embodiment of the invention.

FIG. 1 shows an exemplary configuration of a transmitter according to the first embodiment of the invention.

The transmitter according to the embodiment has a digital modulating part 1, and an intermediate frequency (IF: Intermediate Frequency) limiter 2.

The digital modulating part 1 has a baseband (BB: BaseBand) limiter 11 on the input side and an adder 12 on the output side, and has n paths of signal processing paths therebetween as corresponding to a plurality of n of carriers.

The signal processing paths have band limiting filters A1 to An, up filters (Up filter) B1 to Bn, and digital quadrature modulating parts C1 to Cn, each path has each one of them.

An exemplary operation performed by the transmitter according to the embodiment is shown.

In the embodiment, baseband signals each corresponding to n of carriers having frequencies f1 to fn different from each other are inputted to the BB limiter 11 as signals to be a transmission target (transmitting signals) in the form of digital signals at a chip rate.

The BB limiter 11 detects and reduces outstanding peak electric power in the inputted baseband signals on n of the carriers, and outputs the signals on the carriers after reduction to the band limiting filters A1 to An on the corresponding signal processing paths.

The band limiting filters A1 to An applies band limitation to the inputted signals whose peaks are reduced by the BB limiter 11 so that the bands occupied by the signals fall in the bands set in advance, and outputs the signals after the band limitation to the up filters B1 to Bn.

The up filters B1 to Bn perform a process that upsamples the inputted signals to which band limitation is applied by the band limiting filters A1 to An to a predetermined sampling rate, and outputs the signals resulted therefrom to the digital quadrature modulating parts C1 to Cn.

The digital quadrature modulating parts C1 to Cn apply digital quadrature modulation to the inputted signals which are upsampled by the up filters B1 to Bn at every carrier, and outputs the signals each converted into the IF band to the adder 12. For IFs, for example, 15.36 MHz, 20.36 MHz, 25.36 MHz, and 30.36 MHz may be used.

The adder 12 adds the inputted signals on the carriers to which digital quadrature modulation is applied by the digital quadrature modulating parts C1 to Cn on n of the signal processing paths, and outputs the added result to the IF limiter 2.

The IF limiter 2 detects the peak electric power that is greater than (exceeds) a set threshold in the signal inputted from the adder 12 of the digital modulating part 1, reduces the detected peak electric power, and outputs the signal after reduced.

As described above, in the transmitter according to the embodiment, quadrature modulation is applied to the transmitting signals, which are increased to the IF frequency band, and after that, a signal to which all the carriers are added is inputted to the circuit of the IF limiter 2, and limiting is applied to the signal to which all the carriers are added. All of these process steps are performed by a complex number (IQ signal).

Next, as exemplary limiters usable as the BB limiter 11 and the IF limiter 2, (1) a limiter according to the level fluctuation mode, (2) a limiter according to the phase fluctuation mode, and (3) a limiter according to the window multiplication mode will be described.

(1) In the limiter according to the level fluctuation mode, for example, the voltage (amplitude) of the detected peak is simply reduced to the level of a threshold.

(2) In the limiter according to the phase fluctuation mode, for example, only the phase of each of the carriers is changed to reduce the level after all the carriers are added. In this case, the level of each of the signals on the carriers remains constant. The phase fluctuation mode can be adapted in only the case of multi-carrier.

(3) In the limiter according to the window multiplication mode, for example, the detected peak is multiplied by a window function, whereby the number of items of sample data corresponding to the peak and the window widths therearound is reduced depending on the value of the window function. For the window function, there are the cosine window, the Gausian window, the Kaiser window, etc.

Next, the BB limiter 11 according to the embodiment will be described.

In the embodiment, a limiter according to the level correction mode is used as the BB limiter 11.

In the BB limiter 11 according to the embodiment, for inputted baseband signals on n of carriers, when the sum of electric power for all the carriers of the baseband signals exceeds a predetermined threshold, a process is performed at every sample in which a value of the ratio between the sum of electric power and the threshold (the threshold/the sum of electric power) is multiplied by each of the baseband signals for output, and the level of the sum of electric power is dropped to the threshold.

Here, for the sum of electric power of all the carriers, for example, it is the value obtained by adding all the square values of the voltage (amplitude) values of the I phase and the Q phase in each of the carriers, which is compared with threshold power. Then, each of the IQ signals is multiplied by a value (which is converted into a voltage (amplitude) area) obtained by calculating the square root of the ratio between the peak electric power and the threshold electric power (the threshold/the sum of electric power) separately for each of the carriers. In a simple manner, the absolute values of the voltage (amplitude) values of the I phase and the Q phase of each of the carriers may be simply fully added to use the ratio between the fully added value and the threshold voltage (amplitude), or highly accurate approximation as disclosed in JP-A-2001-285377 may be used.

Alternatively, for the BB limiter 11, a method disclosed in JP-A2003-46480 may be used.

Moreover, the baseband signal in the BB limiter 11 is 1 sample=1 chip.

In the embodiment 1, 24 times oversampled IF signals are used, and after the up filters B1 to Bn, the relation is 24 samples=1 chip.

Next, the IF limiter 2 according to the embodiment will be described.

In the embodiment, as the IF limiter 2, a limiter according to the window multiplication mode is used.

The IF limiter 2 according to the embodiment is configured using an FPGA (Field Programmable Gate Array) in which a window function is multiplied around the originating point of the peak.

Figure 2:
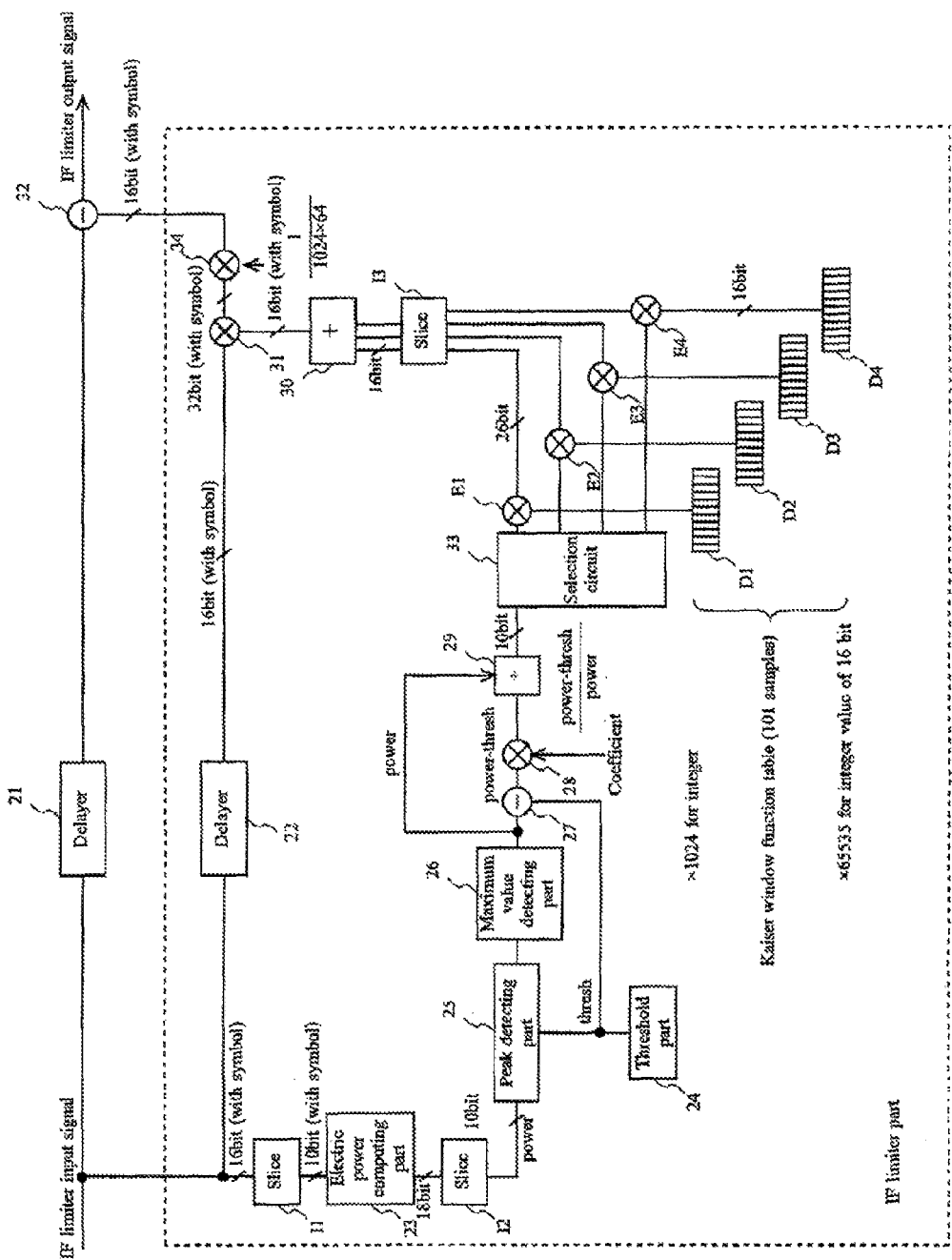
FIG. 2 shows a diagram depicting an exemplary configuration of a window multiplication type IF limiter.

FIG. 2 shows an exemplary configuration of the window multiplication type IF limiter 2.

The IF limiter 2 according to the embodiment has a delayer 21, a delayer 22, an electric power computing part 23, a threshold part 24, a peak detecting part 25, a maximum value detecting part 26, a subtracter 27, a multiplier 28, a divider 29, a plurality of (in the embodiment, four) window function tables D1 to D4, a plurality of (in the embodiment, four) multipliers E1 to E4, an adder 30, a multiplier 31, a subtracter 32, a selection circuit 33, a multiplier 34, and slices I1, I2 and I3.

Moreover, in FIG. 2, the bit (bit) number of a signal is exemplified; those without commenting that it has a symbol have no symbols. In addition, for the bit number, the bit number in FPGA is used. In addition, since these bit numbers are only illustrated, various other forms may be used.

In addition, each of the slices I1, I2 and I3 has the functionality that reduces the bit number of signals by deleting lower order bits of the signals, for example.

An exemplary operation performed by the IF limiter 2 according to the embodiment is shown.

An input signal to the IF limiter 2 is inputted to the electric power computing part 23 through the delayer 21, the delayer 22, and the slice I1.

The delayer 21 delays the input signal to the IF limiter 2, and outputs it to the subtracter 32. Thus, the timing is adjusted for the subtraction performed by the subtracter 32.

The delayer 22 delays the input signal to the IF limiter 2, and outputs it to the multiplier 31. Thus, the timing is adjusted for the multiplication performed by the multiplier 31.

The electric power computing part 23 computes the electric power (power) of the input signal to the IF limiter 2, and outputs the computed result to the peak detecting part 25 through the slice I2.

The threshold part 24 stores a predetermined threshold (thresh) relating to the electric power of the signal, and outputs the threshold value to the peak detecting part 25 and the subtracter 27.

The peak detecting part 25 detects the existence of a peak of electric power when the computed result of electric power inputted from the electric power computing part 23 exceeds the threshold inputted from the threshold part 24, and outputs the detected result to the maximum value detecting part 26.

The maximum value detecting part 26 searches and detects the maximum value of the detected peak that is detected within 25 samples after the peak is detected based on the detected result of the peak inputted from the peak detecting part 25, and outputs the detected result to the subtracter 27 and the divider 29.

The subtracter 27 subtracts the threshold (thresh) inputted from the threshold part 24 from the maximum value (power) inputted from the maximum value detecting part 26, and outputs the subtracted result (power−thresh) to the multiplier 28.

The multiplier 28 multiplies the subtracted result inputted from the subtracter 27 by a predetermined coefficient a, and outputs the multiplied result to the divider 29. Primarily, it is necessary to give to the multipliers E1 to E4 the value obtained by subtracting the square root of (thresh/power) from 1. However, in the embodiment, it is configured in which the computation of the square root is omitted by an approximation expressed by [Equation 1], and the coefficient a is multiplied for correction, instead.

$$1 - \sqrt{\frac{thresh}{power}} < 1 - \frac{thresh}{power} \quad \text{(Equation 1)}$$

$$1 - \sqrt{\frac{thresh}{power}} \cong \left(\frac{power - thresh}{power}\right) \times a$$

Moreover, the coefficient a is a real constant ranging from 0.5 to 1, for example, and excellent approximation is given where (1/1.5). Actually, 1024/1.5 is used so that the later divided result is an integer.

The divider 29 divides the multiplied result (power−thresh is multiplied by the coefficient) inputted from the multiplier 28 by the maximum value (power) inputted from the maximum value detecting part 26, and outputs the divided result (peak relating value) to the selection circuit 33.

The selection circuit 33 persistently outputs the divided result inputted from the divider 29 to a single multiplier selected from four multipliers E1 to E4 in a cyclic manner.

For example, each of the window function tables D1 to D4 has a table of 101 samples of Kaiser window functions in the same description, and outputs the value to the corresponding multipliers E1 to E4.

The multipliers E1 to E4 multiply the divided result by the value inputted from the corresponding window function tables D1 to D4 every time when a new divided result is inputted from the selection circuit 33, and outputs the multiplied result to the adder 30 through the slice I3.

The adder 30 adds the values inputted from four multipliers E1 to E4, and outputs the added result (a coefficient for generating a level reduction signal) to the multiplier 31.

The multiplier 31 multiplies the signal inputted from the delayer 22 by the added result inputted from the adder 30, and outputs the multiplied result (level reduction signal) to the multiplier 34.

The multiplier 34 multiplies the input from the multiplier 31 by a coefficient (in the embodiment, {1/(1024×64)} that corresponds to the signal width of the window function tables D1 to D4), and outputs the multiplied result to the subtracter 32. The multiplier 34 may be a slice means.

The subtracter 32 subtracts the signal inputted from the multiplier 31 from the signal inputted from the delayer 21, and outputs the signal of the subtracted result as the output signal from the IF limiter 2.

As described above, in the IF limiter 2 according to the embodiment, in the outline, the difference between the peak electric power and the threshold power, that is, the amount of electric power by which the threshold is exceeded is detected, and the amount of electric power or the correction value is subtracted from the signal in the main line. Moreover, in the embodiment, since the subtractions are separately performed for the I and Q phases, the subtraction is performed in voltage (amplitude), properly speaking. Alternatively, as another example, the signal in the main line may be directly multiplied by a window function in the size in accordance with the square root of the ratio between the peak electric power and the threshold power. However, in this case, the computation of the square root cannot be omitted.

In addition, in the IF limiter 2 according to the embodiment, since a delay occurs due to the computation in the branch circuit for detecting the peak, a delay is generated in the main line when the amount to reduce the peak determined in the branch circuit is added to or subtracted from the signal on the main line (in the embodiment, subtraction).

Here, in the window multiplication type IF limiter 2 according to the embodiment, the number of samples for maximum value search, the window width, the value of the window function (the window function type), the limiter threshold, and the optimization coefficient for fine control of the amount to reduce the peak, parameter values are each set as a fixed value in FPGA. Then, preferably, these parameter values are adjusted to fined and decide the combination of the values that can obtain the most excellent limiter characteristic.

For example, in the simulation performed under certain conditions, −59.8 dB was obtained as ACLR, −40.3 dB as PkCDE (Peak Code Domain Error), and 9.4 percent (%) as EVM (Error Vector Magnitude), where the number of samples for maximum value search was 20, and −60.0 dB as ACLR, −39.8 dB as PkCDE, and 9.5 percent (%) as EVM, where the number of samples for maximum value search was 25, resulting in almost the same performance. This demonstrates that the optimum value of the number of samples for maximum value search is around 20 to 25 (in a time period, around between about 0.8 to 1 chip), or that it is around about ¼ to ⅕ for the window width.

In addition, in the maximum value detecting part 26 according to the embodiment, 25 samples are set as the number of samples for maximum value search to be a parameter. For example, such a peak is found that takes the maximum value within the number of samples for maximum value search (in the embodiment, 25 samples that is equivalent to about 1 chip) after the first peak is detected. Thus, resulting in the maximum value=a peak.

Moreover, the reason why the maximum value detecting part 26 is provided is that a peak does not always appear only in a single sample, for example. Generally, the greater the oversampling ratio becomes, the greater the tendency becomes that a peak is detected continuously in a few samples. When all of them are multiplied by a window function, the peak is reduced more than required, leading to the degradation of signal quality. Therefore, the greatest peak is multiplied by a window function to reduce the peak, whereby the relatively small adjacent peaks are reduced at the same time.

In addition, the reason why the maximum value detecting part 26 is provided is that the processing load of FPGA becomes great when all of the continuing peaks are multiplied by a window function, for example.

In addition, in the embodiment, in the case in which the window width is 101 samples (which is equivalent to about 4 chip), a plurality of the window function tables (memory tables for window) D1 to D4 and a plurality of the multipliers E1 to E4 are provided so as to allow parallel processing when a plurality of peaks to be a target for window function multiplication exists within 101 samples, for example. In the embodiment, since the number of samples for maximum value search is 25 samples, four window function table D1 to D4 and four multipliers E1 to E4 are provided.

Moreover, for the number of the multipliers for multiplication of the window function table and the value of the window function, various numbers may be used.

Next, an example of a specific advantage obtained by the transmitter according to the embodiment is shown.

In the embodiment, the IF limiter 2 is arranged in the later stage of the band limitation performed by the band limiting filters A1 to An (and, in the later stage of digital quadrature modulation), whereby peak electric power can be reduced to the set threshold.

Figure 3:
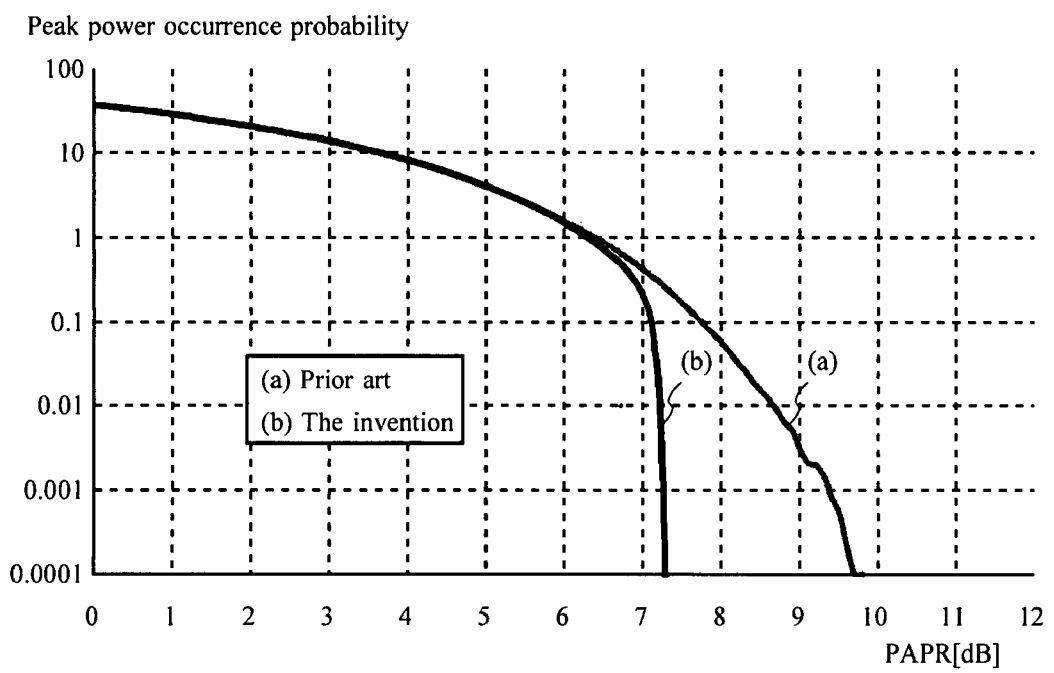
FIG. 3 shows a diagram depicting an exemplary complementary cumulative distribution function.
Figure 6:
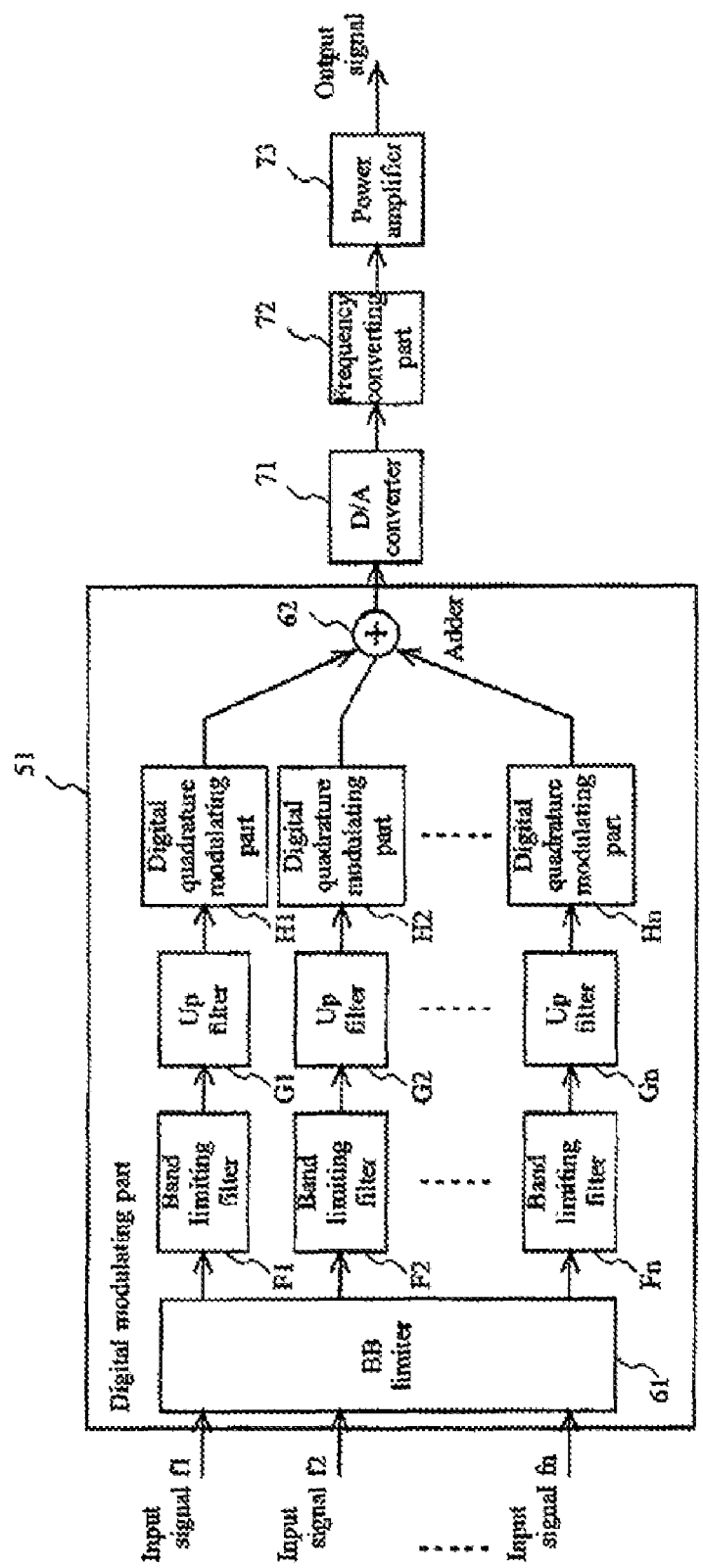
FIG. 6 shows a diagram depicting an exemplary configuration of a transmitting amplifier.

FIG. 3 shows: (a) an example of "the prior art" in which only the BB limiter 61 is used as the limiter as shown in FIG. 6, for example, and (b) an example of a complementary cumulative distribution function (CCDF: Complementary Cumulative Distribution Function) for "the invention" in which the BB limiter 11 and the IF limiter 2 are combined for use as the limiter as shown in FIG. 1, for example. In a graph shown in FIG. 3, the horizontal axis indicates a peak electric power to average electric power ratio (PAPR: Peak to Average Power Ratio) [dB], and the vertical axis indicates the peak power occurrence probability.

Here, for the threshold to determine peak electric power in the IF limiter 2, the level was set so that PAPR is 7.3 [dB].

In the CCDF curve when no limiting is applied by the IF limiter 2 ((*a*) "the prior art"), PAPR is 9.8 [dB] when the probability of the occurrence of the peak is 0.0001 [%], whereas in the CCDF curve when limiting is applied by the IF limiter 2 ((*b*) "the invention"), PAPR is 7.3 [dB] when the probability of the occurrence of the peak is 0.0001 [%], showing that the peak is reduced to the threshold level.

As described above, the limiter is applied in the IF frequency band, whereby a significant reduction in PAPR is made possible.

As described above, in the transmitter according to the embodiment, in transmission of a single or a plurality of communication channels, for the input signal, the digital modulating part 1 having m (m is one or more natural numbers, denoting the number of carriers) of digital modulation functionalities, and the IF limiter 2 having the functionality of peak electric power suppression in which outstanding peak electric power is detected and reduced in the output (transmitting signal) from the digital modulating part 1 are provided.

Therefore, in the transmitter according to the embodiment, the peak restored due to the band limitation by the band limiting filters A1 to An arranged in the subsequent stage of the peak limiter (in the embodiment, the BB limiter 11) in the baseband can be suppressed by the peak limiter (in the embodiment, the IF limiter 2) in the IF band, whereby the reproduction of the peak in the output signal is removed to obtain a greater PAPR reduction effect.

Here, in the transmitter according to the embodiment, for example, for the BB limiter 11 and the IF limiter 2, various forms may be used for the internal configuration of the limiter, the mode to suppress peak electric power by the limiter, the number of limiters arranged in the baseband, the number of limiters arranged in the IF band, manners of combining the BB limiter and the IF limiter, etc. For example, the limiter is not limited to those performing processing by the IQ signal. The stage after the digital quadrature modulating parts C1 to Cn may be processed with a real signal.

In addition, as described in the embodiment, both of the BB limiter 11 and the IF limiter 2 are arranged to obtain a significant limiting effect. However, for example, the IF limiter is arranged to obtain the effect exerted by the IF limiter, even though the BB limiter is not provided.

Moreover, in the transmitter according to the embodiment, a baseband limiter means is configured of the functionality of the BB limiter 11, the band limiting filter means is configured of the functionality of n of the band limiting filters A1 to An arranged for each of the carriers, the upsampling means is configured of the functionality of n of the up filters B1 to Bn arranged for each of the carriers, the quadrature modulation processing means is configured of the functionality of n of the digital quadrature modulating parts C1 to Cn arranged for each of the carriers, the adding means is configured of the functionality of the adder 12, and the intermediate frequency limiter means is configured of the functionality of the IF limiter 2.

In addition, in the IF limiter 2 according to the embodiment, the peak detecting means is configured of the functionality of detecting the peak (in the embodiment, the maximum value within a predetermined range) by the electric power computing part 23, the threshold part 24, the peak detecting part 25 and the maximum value detecting part 26, the peak relating value generating means is configured of the functionality of computing and generating the value (the peak relating value) relating to a predetermined peak by the subtracter 27, the multiplier 28 and the divider 29, the level reduction coefficient generating means is configured of the functionality of computing and generating the coefficient for generating the level reduction signal by the window function tables D1 to D4, the multipliers E1 to E4 and the adder 30, the level reduction signal generating means is configured of the functionality of computing and generating the level reduction signal by the delayer 22 and the multiplier 31, and the level reduction signal subtraction means is configured of the functionality of subtracting the level reduction signal from the input signal to generate the output signal by the delayer 21 and the subtracter 32.

Embodiment 2

A second embodiment of the invention will be described.

Figure 4:
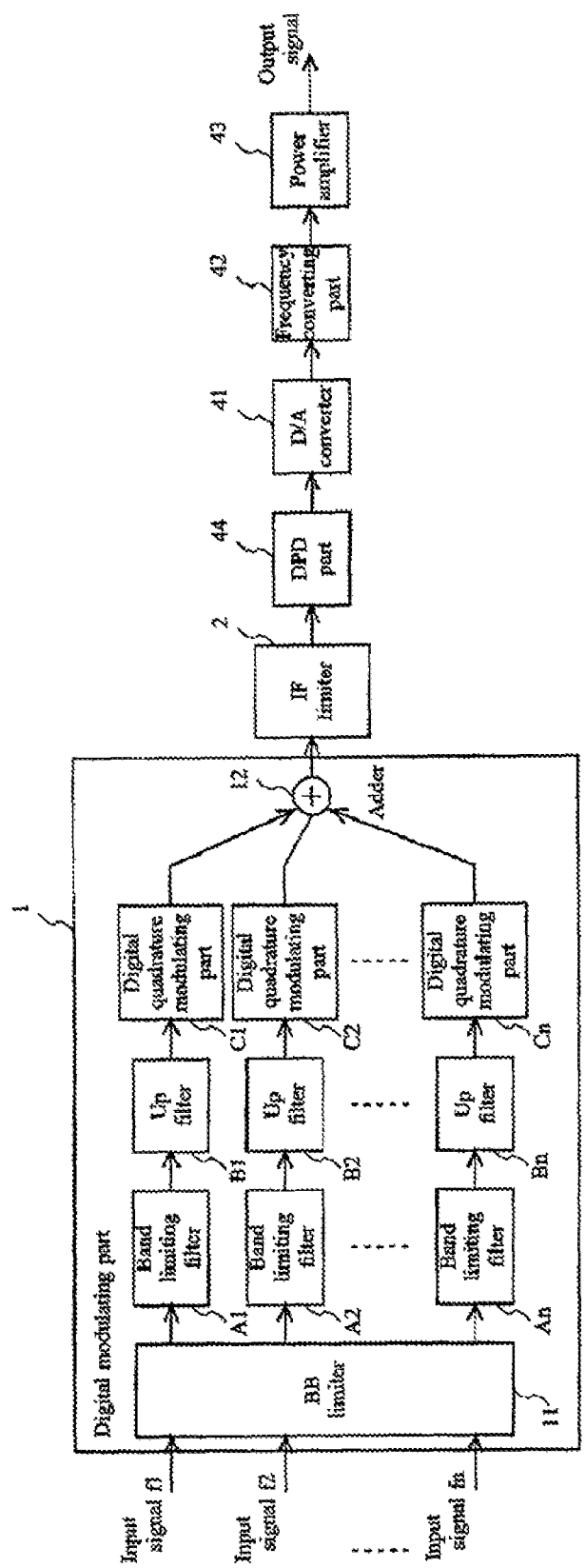
FIG. 4 shows a diagram depicting an exemplary configuration of a transmitting amplifier according to a second embodiment of the invention.

FIG. 4 shows an exemplary configuration of a transmitting amplifier according to an embodiment of the invention.

The transmitting amplifier according to the embodiment has the configuration of a transmitter formed of a digital modulating part 1 and an IF limiter 2 as similar to that shown in FIG. 1. In the subsequent stage of the IF limiter 2, a DPD (Digital Pre-Distortion) part 44, a D/A converter 41, a frequency converting part 42, and a power amplifier (PA) 43 are provided.

Moreover, in the embodiment, the portion of the configuration of the transmitter formed of the digital modulating part 1 and the IF limiter 2 is the same as that of FIG. 1, omitting the descriptions using the same numerals and signs.

An exemplary operation performed by the transmitting amplifier according to the embodiment is shown.

The DPD part 44 receives an IF signal that is processed by the digital modulating part 1 and the IF limiter 2 and outputted from the IF limiter 2, gives it the inverse characteristic of distortion that occurs in the power amplifier 43, and outputs it to the D/A converter 41. The D/A converter 41 receives the digital signal outputted from the DPD part 44, converts the input signal from the digital signal into an analog signal, and outputs it to the frequency converting part 42.

The frequency converting part 42 uses an analog quadrature modulator, for example, to convert the analog signal inputted from the D/A converter 41 from a complex signal in the IF band into a signal in the radio frequency (RF: Radio Frequency) band, and outputs it to the power amplifier 43.

The power amplifier 43 amplifies and outputs the signal in the RF band inputted from the frequency converting part 42. The amplified signal is transmitted from an antenna (not shown) by radio.

As described above, the transmitting amplifier according to the embodiment has the configuration in which the transmitter as shown in FIG. 1 is mounted on a unit having the power amplifier 43. Accordingly, as similar to the transmitter, the peak that occurs in the transmitting signal electric power is reduced to improve the quality of the transmitting signal.

Figure 5:
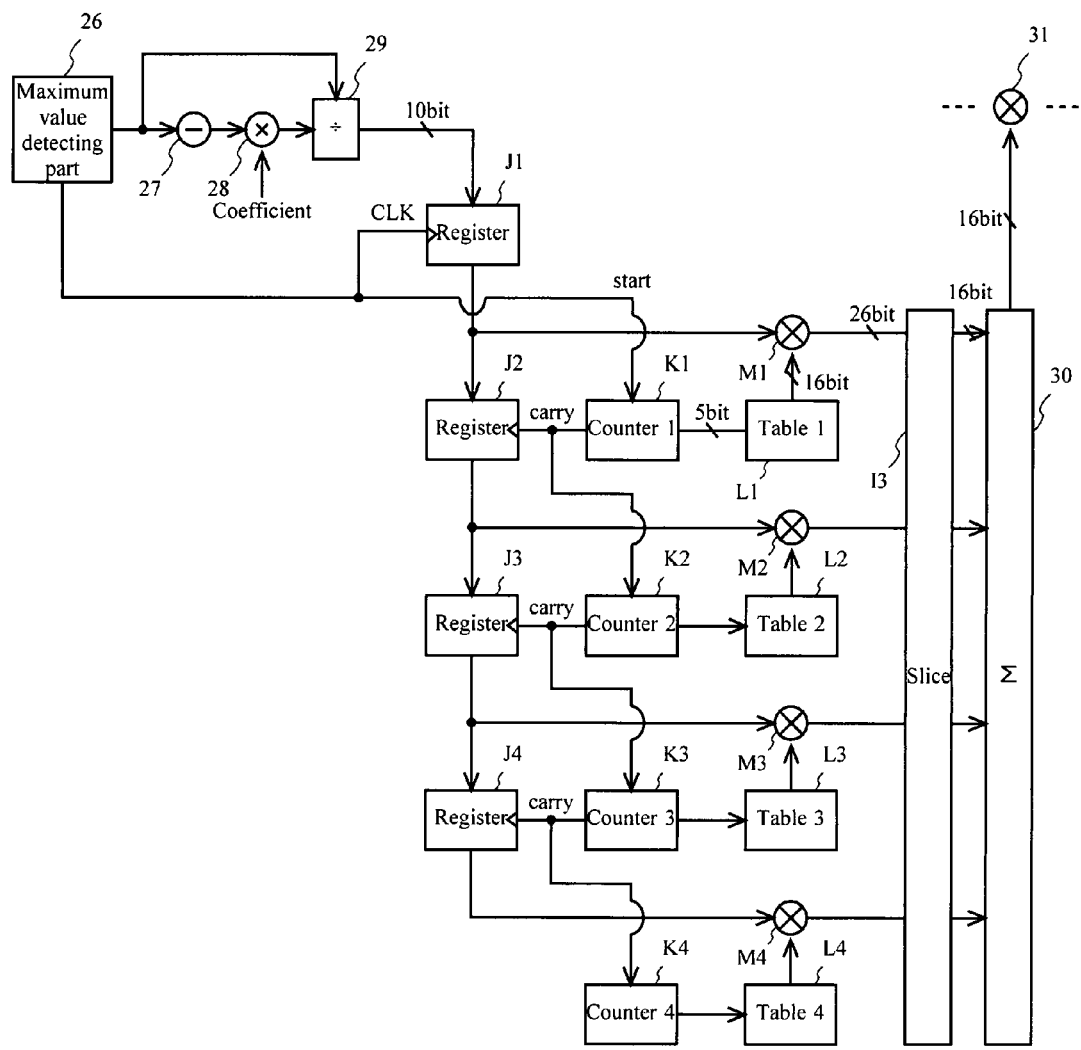
FIG. 5 shows a diagram depicting an exemplary configuration of a window multiplication type IF limiter.

FIG. 5 mainly shows an exemplary configuration of the portion different from that shown in FIG. 2, as an exemplary configuration of the IF limiter 2 according to the embodiment.

In the configuration of the IF limiter 2 shown in FIG. 5, the size of window function tables is reduced to one fourth so that it is suited for mounting.

More specifically, instead of the portions of the selection circuit 33, the window function tables D1 to D4, and the multipliers E1 to E4 shown in FIG. 2, four registers J1 to J4, four counters K1 to K4, four tables L1 to L4 configuring a window function table, and four multipliers M1 to M4 are provided.

In the embodiment, the detection of the maximum peak is performed at intervals of 26 samples or more. Therefore, a single window function formed of 101 (or 100) samples is divided into four by every 25 samples, and four parts are stored in four tables L1 to L4, whereby parallel access can be made to four window functions with no multiple access to a single window function table.

The registers J1 to J4 are a register of 10 bit width that stores data when a clock signal CLK is inputted. In the register J1, a maximum value detecting part 26 determines the maximum value (after 25 samples from peak detection), receives the clock signal CLK at the timing that the time period from the peak detection to the maximum value has further elapsed (when the computation time period from 27 to 29 is longer, the time period has elapsed), and stores the divider output (output from a divider 29) corresponding to the maximum value.

The counters K1 to K4 is a 25 count-cycle counter that begins counts at the sample rate at the time when a start (start) pulse is inputted and outputs a carry (carry) pulse to stop the counts when the count value reaches 25 (or 24).

An exemplary operation performed by the registers J1 to J4, the counters K1 to K4, tables L1 to L4, and the multipliers M1 to M4 according to the embodiment is shown.

For the clock signal CLK of the register J1 and the start pulse of the counter K1, a signal is used at the timing at which the maximum value is detected by the maximum value detecting part 26.

The register J1 stores the output from the divider 29 in response to the clock signal CLK, and the stored information is in turn transmitted to the subsequent register J2, the register J3, and the register J4. In addition, the output from the register J1 is inputted to the multiplier M1.

The counter K1 begins counts in response to the input of the start pulse, and outputs a carry pulse as the clock signal CLK of the register J2 and the start pulse of the counter K2 when the count value reaches 25. In addition, the counter K1 outputs the count value to the table L1.

The table L1 sequentially outputs the table value to the multiplier M1 in response to the input from the counter K1.

The multiplier M1 multiplies the input from the register J1 by the input from the table L1, and outputs the multiplied result to an adder 30 through a slice I3.

In addition, for the registers J2 to J4, the counters K2 to K4, the tables L2 to L4, and the multipliers M2 to M4 after the second stage, the process steps similar to those in the first stage are performed. Moreover, in the embodiment, since the counter K4 in the fourth stage does not have the register and the counter in the subsequent stage, it has no output thereto.

In this configuration, in the first 25 counts, the output from the divider 29 is sequentially multiplied by the table values stored in the table L1 in the first stage. In the subsequent 25 counts, it is sequentially multiplied by the table values stored in the table L2 in the second stage. In the subsequent 25 counts, it is sequentially multiplied by the table values stored in the table L3 in the third stage. In the subsequent 25 counts, it is sequentially multiplied by the table values stored in the table L4 in the fourth stage. These are outputted through the slice I3 and the adder 30, whereby the values are obtained by sequentially multiplying the output from the divider 29 by the table values of the four tables L1 to L4. In other words, such a result can be obtained that is similar to the case in which the table values of the four tables L1 to L4 are combined and stored in a single window function table.

Embodiment 3

This embodiment is that the invention is adapted to a transmitter which is mounted on a base station unit, for example, in the radio communication system adapting the CDMA mode. In such a transmitter, generally, high power signal amplification is performed by an amplifier. Moreover, the amount to suppress the peak level is sometimes restrained, but for example, the invention may be adapted to the modulation mode such as OFDM as well.

The embodiment is different from the embodiments 1 and 2 in that a peak suppression coefficient that is newly generated is made small depending on the degree of overlapping with the peak suppression coefficient that has been generated in the past.

Figure 7:
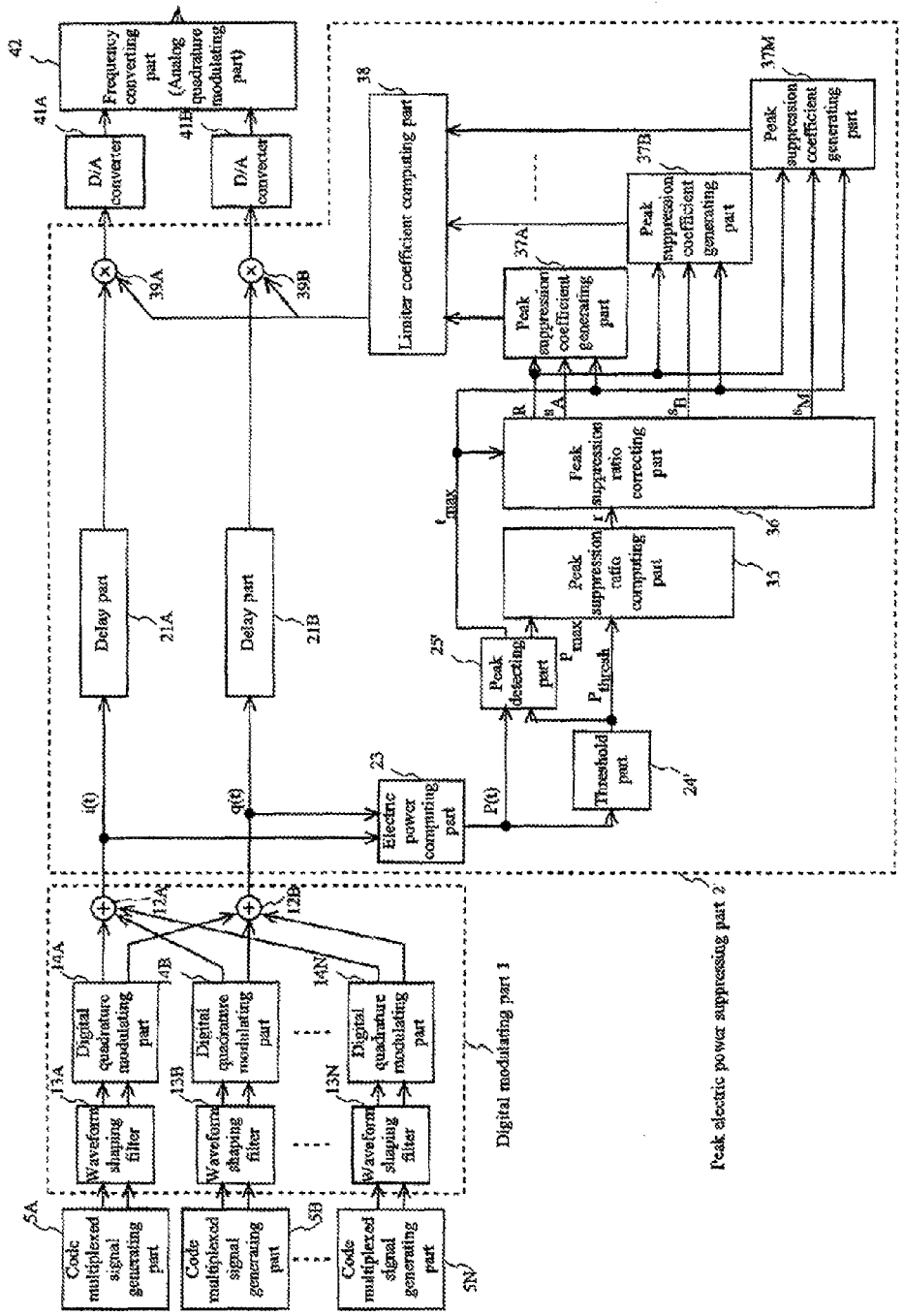
FIG. 7 shows a diagram depicting an exemplary configuration of a transmitter according to a third embodiment of the invention.

FIG. 7 shows a diagram depicting an exemplary configuration of a transmitter according to the embodiment.

To the transmitter according to the embodiment, n of code multiplexed signal generating parts 5A to 5N are connected as corresponding to a plurality of n of carriers A to N.

In the transmitter according to the embodiment, a digital modulating part 1, a peak electric power suppressing part 2', D/A converters 41A and 41B, and a frequency converting part 42 are provided.

In the digital modulating part 1, n of waveform shaping filters 13A to 13N and n of digital quadrature modulating parts 14A to 14N are provided as corresponding to n of the carriers A to N, and two adders 12A and 12B are provided as corresponding to an I phase component (I component) and a Q phase component (Q component).

Moreover, the waveform shaping filters 13A to 13N correspond to the combination of the band limiting filters A1 to An and the up filters B1 to Bn in the embodiment 1, the digital quadrature modulating parts 14A to 14N are equivalent to the digital quadrature modulating parts C1 to Cn in the embodiment 1, and the combination of the adders 12A and 12B is the same as the adder 12 in the embodiment 1.

In the peak electric power suppressing part 2', an electric power computing part 23, a threshold part 24', a peak detecting part 25', a peak suppression ratio computing part 35, a peak suppression ratio correcting part 36, and a limiter coefficient computing part 38 are provided, and m of peak suppression coefficient generating parts 37A to 37M which are separately driven at the same time instant are provided, and two delay parts 21A and 21B and two multipliers 39A and 39B are provided as corresponding to the I component and the Q component.

The combination of the D/A converters 41A and 41B is the same as the D/A converter 41 in the embodiment 2, and the frequency converting part 42 is also configured of an analog quadrature modulator as similar to the embodiment 2.

An exemplary operation performed by the transmitter according to the embodiment is shown.

Moreover, t denotes the time instant of sampling signals.

The waveform shaping filters 13A to 13N receive each carrier that is spread, modulated and combined by the code multiplexed signal generating parts 5A to 5N for each of the I component and the Q component, shape the spectrum so that the band occupied by the input signal falls in a value set in advance, and output the resulted I component and Q component with the spectrum shaped to each of the digital quadrature modulating parts 14A to 14N.

The digital quadrature modulating parts 14A to 14N apply digital quadrature modulation to the signal on each carrier inputted from each of the waveform shaping filters 13A to 13N, output the I component resulted from the digital quadrature modulation to one adder 12A, and output the Q component resulted from the digital quadrature modulation to another adder 12B.

The one adder 12A adds (combines) the digital quadrature modulation result inputted from n of the digital quadrature modulating parts 14A to 14N for the I component, and outputs a signal i(t) of the added result to the electric power computing part 23 and one delay part 21A.

The another adder 12B adds the digital quadrature modulation result inputted from n of the digital quadrature modulating parts 14A to 14N for the Q component, and outputs the signal q(t) of the added result to the electric power computing part 23 and another delay part 21B.

The electric power computing part 23 computes an instantaneous power p(t) of the signal of the added result based on the I component i(t) and the Q component q(t) that are the signals of the added result inputted from two adders 12A and 12B, and outputs the computed result to the threshold part 24' and the peak detecting part 25'. Here, as an example, the instantaneous power P(t) is expressed as [Equation 2].

$$P(t) = i^2(t) + q^2(t) \quad \text{(Equation 2)}$$

The threshold part 24' generates a threshold power $P_{thresh}$ for peak suppression based on the instantaneous power P(t) computed by the electric power computing part 23, and outputs the result of setting to the peak detecting part 25' and the peak suppression ratio computing part 35. Here, as an example, when (the average electric power+6 dB) is set as the threshold electric power $P_{thresh}$, the threshold electric power $P_{thresh}$ is expressed as [Equation 3]. Moreover, T is the number of signals for equalization, various numbers may be used.

$$P_{thresh} = \frac{10^{(8/10)}}{T} \sum_{t}^{T} P(t) \quad \text{(Equation 3)}$$

The peak detecting part 25' compares the instantaneous power P(t) inputted from the electric power computing part 23 with the threshold power $P_{thresh}$ inputted from the threshold part 24'. When it detects a maximum at which the instantaneous power P(t) exceeds the threshold power $P_{thresh}$, it outputs a maximum electric power $P_{max}$ of the maximum to the peak suppression ratio computing part 35, and outputs a maximum sample time instant $t_{max}$ of the maximum to the peak suppression ratio correcting part 36 and m of the peak suppression coefficient generating parts 37A to 37M.

The peak suppression ratio computing part 35 operates when a maximum exceeding the threshold power $P_{thresh}$ is detected. It computes a predetermined peak suppression ratio r based on the threshold power $P_{thresh}$ inputted from the threshold part 24' and the maximum electric power $P_{max}$ inputted from the peak detecting part 25', and outputs the computed result to the peak suppression ratio correcting part 36.

Here, as an example, the peak suppression ratio r is expressed as [Equation 4].

Moreover, in the embodiment, since the maximum electric power $P_{max}$ and the threshold power $P_{thresh}$ are represented by the dimension of electric power, the computation of the square root (sart) is performed in order to perform the peak level suppression in the voltage area.

$$r = 1 - \sqrt{\frac{P_{thresh}}{P_{max}}} \quad \text{(Equation 4)}$$

The peak suppression ratio correcting part 36 operates when a maximum exceeding the threshold power $P_{thresh}$ is detected. Based on the maximum sample time instant $t_{max}$ inputted from the peak detecting part 25', the peak suppression ratio r inputted from the peak suppression ratio computing part 35, a single or a plurality of the maximum sample time instants that have been inputted from the peak detecting part 25' in the past, and a single or a plurality of the corrected peak suppression ratios that have been generated in the peak suppression ratio correcting part 36, it subtracts the value at the maximum sample time instant $t_{max}$ of each of the peak suppression coefficients around a single or a plurality of the maximum sample time instants generated in the past from the peak suppression ratio r to compute a corrected peak suppression ratio R, outputs the computed result to m of the peak suppression coefficient generating parts 37A to 37M, and outputs a start signal to any one of the peak suppression coefficient generating parts that are idle in m of the peak suppression coefficient generating parts 37A to 37M.

Figure 8:
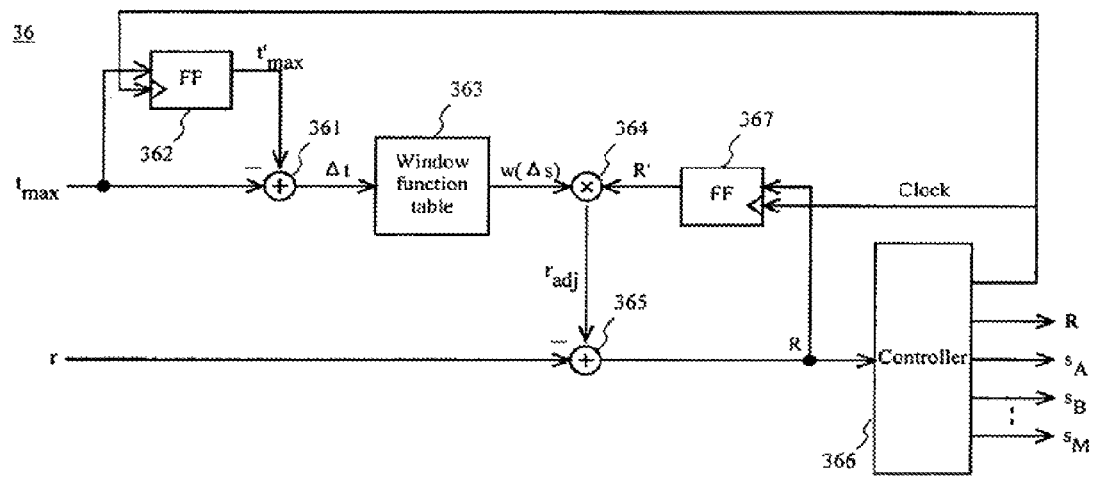
FIG. 8 shows an exemplary configuration of a peak suppression ratio correcting part 36 according to the third embodiment.

FIG. 8 shows an exemplary configuration of the peak suppression ratio correcting part 36 based on a single latest maximum sample time instant $t'_{max}$ detected in the past and a single latest corrected peak suppression ratio R' computed in the past.

The peak suppression ratio correcting part 36 according to the embodiment has an adder 361, a flip flop (FF) 362, a window function table 363, a multiplier 364, an adder 365, a controller 366, and a flip flop 367, which operates when a maximum exceeding the threshold power $P_{thresh}$ is detected.

The adder 361 subtracts the past maximum sample time instant $t'_{max}$ inputted from the flip flop 362 from the maximum sample time instant $t_{max}$ inputted from the peak detecting part 25', computes a difference $\Delta t$ between two adjacent maximum sample time instants, and outputs the computed result to the window function table 363. The difference $\Delta t$ is expressed as [Equation 5].

$$\Delta t = t_{max} - t'_{max} \qquad \text{(Equation 5)}$$

The flip flop 362 holds the maximum sample time instant $t_{max}$ inputted from the peak detecting part 25' as the latest maximum sample time instant $t'_{max}$ detected in the past in synchronization with the clock signal inputted from the controller 366, described later, and outputs it to the adder 361.

The window function table 363 selects a window function value $w(\Delta t)$ at the sample position separated by $\Delta t$ from the center of the window function while the difference $\Delta t$ inputted from the adder 361 is a reference address, and outputs the selected result to the multiplier 364.

As an example, when a Hamming window is used, the window function value $w(\Delta t)$ is expressed as [Equation 6]. Moreover, L is the number of samples, for example, it denotes a multiple of 2 which is 2 or greater. In addition, $\Delta t$ takes a value in the section between 0 to (+L/2) ($[0 \leq \Delta t \leq +L/2]$).

$$w(\Delta t) = 0.54 + 0.46 \cos(2\pi \Delta t / L) \qquad \text{(Equation 6)}$$

The multiplier 364 multiplies the window function value $w(\Delta t)$ inputted from the window function table 363 by the past corrected peak suppression ratio R' inputted from the flip flop 367, computes a peak suppression ratio correction value $r_{adj}$, and outputs the computed result to the adder 365. In other words, it is expressed by:

$$r_{adj} = R' \times w(\Delta t)$$

Moreover, the peak suppression ratio correction value $r_{adj}$ is the same value as the peak suppression coefficients at the maximum sample time instant $t_{max}$ of the peak suppression coefficient around the maximum sample time instant $t'_{max}$, described later.

The adder 365 subtracts the peak suppression ratio correction value $r_{adj}$ inputted from the multiplier 364 from the peak suppression ratio r inputted from the peak suppression ratio computing part 35, computes the corrected peak suppression ratio R, and outputs the computed result to the controller 366 and the flip flop 367. The corrected peak suppression ratio R is finally expressed as [Equation 7].

$$R = r - r_{adj} = \left(1 - \sqrt{\frac{P_{thresh}}{P_{max}}}\right) - R' \times w(t_{max} - t'_{max}) \qquad \text{(Equation 7)}$$

The controller 366 determines the magnitude of the corrected peak suppression ratio R inputted from the adder 365. When the corrected peak suppression ratio R is a positive value, it outputs the clock signal to the flip flop 362 and the flip flop 367, outputs the corrected peak suppression ratio R to m of the peak suppression coefficient generating parts 37A to 37M, and outputs start signals sA to sM to any one of the peak suppression coefficient generating parts that are idle in m of the peak suppression coefficient generating parts 37A to 37M.

Moreover, when the corrected peak suppression ratio R is zero or a negative value, it means that it is unnecessary to generate the peak suppression coefficients around the maximum sample time instant $t_{max}$ because the maximum power $P_{max}$ is suppressed to equal to or below the threshold electric power $P_{thresh}$ by the peak suppression coefficients around the maximum sample time instant $t'_{max}$.

The flip flop 367 holds the corrected peak suppression ratio R inputted from the adder 365 as the latest corrected peak suppression ratio R' that has been computed in the past in synchronization with the clock signal inputted from the controller 366, and outputs it to the multiplier 364.

As described above, in an exemplary peak suppression ratio correcting part 36, the peak suppression coefficient at the maximum sample time instant $t_{max}$ of the peak suppression coefficients around the maximum sample time instant $t'_{max}$ is combined with the peak suppression coefficient at the maximum sample time instant $t_{max}$ of the peak suppression coefficients around the maximum sample time instant $t_{max}$ by the limiter coefficient computing part 38, described later, and then the peak suppression coefficient is generated. Therefore, the peak suppression coefficient can suppress the maximum electric power $P_{max}$ at the maximum sample time instant $t_{max}$ to the threshold power $P_{thresh}$.

The peak suppression coefficient generating parts 37A to 37M operate separately in response to m of peaks at the maximum to be a target for suppression. For example, when the start signal is inputted from the peak suppression ratio correcting part 36, they weight the corrected peak suppression ratio R by the window function w(t) in the section between time instant $(t_{max}-L/2)$ to time instant $(t_{max}+L/2)$ based on the maximum sample time instant $t_{max}$ inputted from the peak detecting part 25' and the corrected peak suppression ratio R inputted from the peak suppression ratio correcting part 36, and output the weighted result as peak suppression coefficients gA(t) to gM(t) to a peak suppression coefficient combining part (the limiter coefficient computing part 38).

Here, as an example, the peak suppression coefficient gA(t) using the same Hamming window w(t) as Equation 6 is expressed as [Equation 8].

$$g_A(t) = \qquad \text{(Equation 8)}$$
$$\begin{cases} R \times w(t - t_{max}) & \text{in the case of } \left(t_{max} - \frac{L}{2} \leq t \leq t_{max} + \frac{L}{2}\right) \\ 0 & \text{in the case of } \left(t < t_{max} - \frac{L}{2}, t > t_{max} + \frac{L}{2}\right) \end{cases}$$

Moreover, the peak suppression coefficients gB(t) to gM(t) are expressed as similar to Equation 8.

The limiter coefficient computing part 38 adds all of m of the peak suppression coefficients gA(t) to gM(t) inputted from the peak suppression coefficient generating parts 37A to 37M, for example, further computes a limiter coefficient l(t) by subtracting the all added result from 1, and outputs the computed result to the multipliers 39A and 39B. In other words, it is expressed by:

$$l(t) = 1 - \{gA(t) + gB(t) + \ldots + gM(t)\}.$$

The delay parts 21A and 21B delay the signals of the added results i(t) and q(t) inputted from the adders 12A and 12B for a time period corresponding to L/2, or a time period required from the process of computing the instantaneous power P(t) in the electric power computing part 23 to the process of computing the limiter coefficient in the limiter coefficient computing part 38 when this time period is longer. They then output the delay-adjusted signal to the multipliers 39A and 39B.

The multipliers 39A and 39B multiply the signals of the added results i(t) and q(t) inputted from the delay parts 21A and 21B by the limiter coefficient l(t) inputted from the limiter coefficient computing part 38, whereby they suppress the peak and the signal level therearound, and output the multiplied results i'(t) and q'(t) to the D/A converters 41A and 41B. In other words, it is expressed by:

$$i'(t)=l(t)\times i(t),$$

$$q'(t)=l(t)\times q(t).$$

The D/A converters 41A and 41B convert the digital signals inputted from the multipliers 39A and 39B into analog signals, and output the results of D/A conversion to the frequency converting part 42.

The frequency converting part 42 applies analog quadrature modulation to the analog signals formed of the I component and the Q component inputted from the two D/A converters 41A and 41B, whereby it converts the signals into signals in the radio frequency band, and outputs them.

Figure 9:
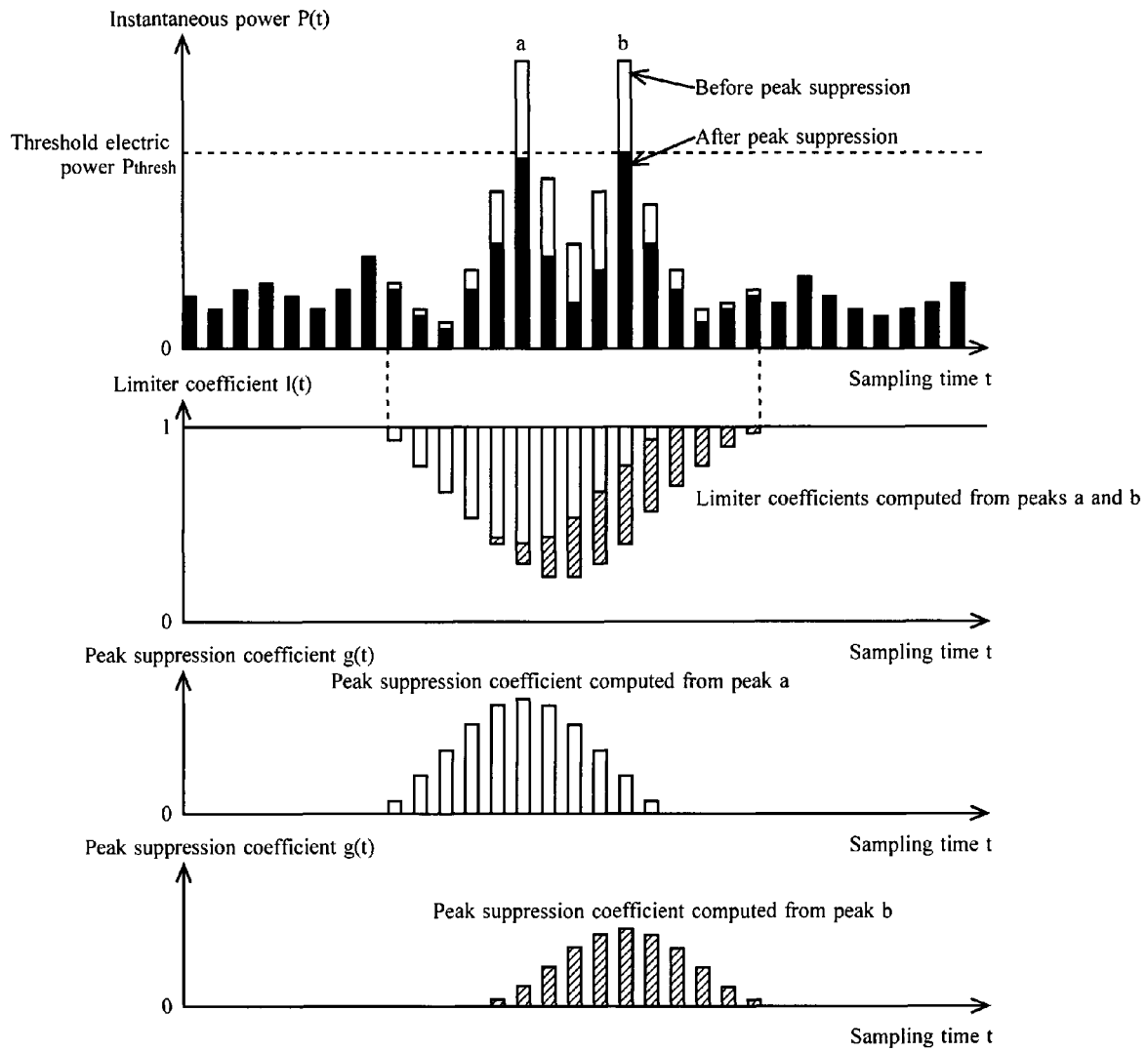
FIG. 9 shows diagrams depicting a manner of the suppression of peak electric power according to the third embodiment.

FIG. 9 shows diagrams depicting a manner of the suppression of peak electric power in the embodiment, showing examples of the instantaneous power P(t), the threshold electric power $P_{thresh}$, the limiter coefficient l(t), and the peak suppression coefficient g(t) for a time instant (sampling time t).

As shown in the drawings, although Peak a and Peak b have the same instantaneous power, a peak suppression coefficient computed from Peak b is smaller than a peak suppression coefficient computed from Peak a, and the instantaneous power of Peak b is suppressed to the threshold electric power by the limiter coefficients computed from two peak suppression coefficients.

Figure 10:
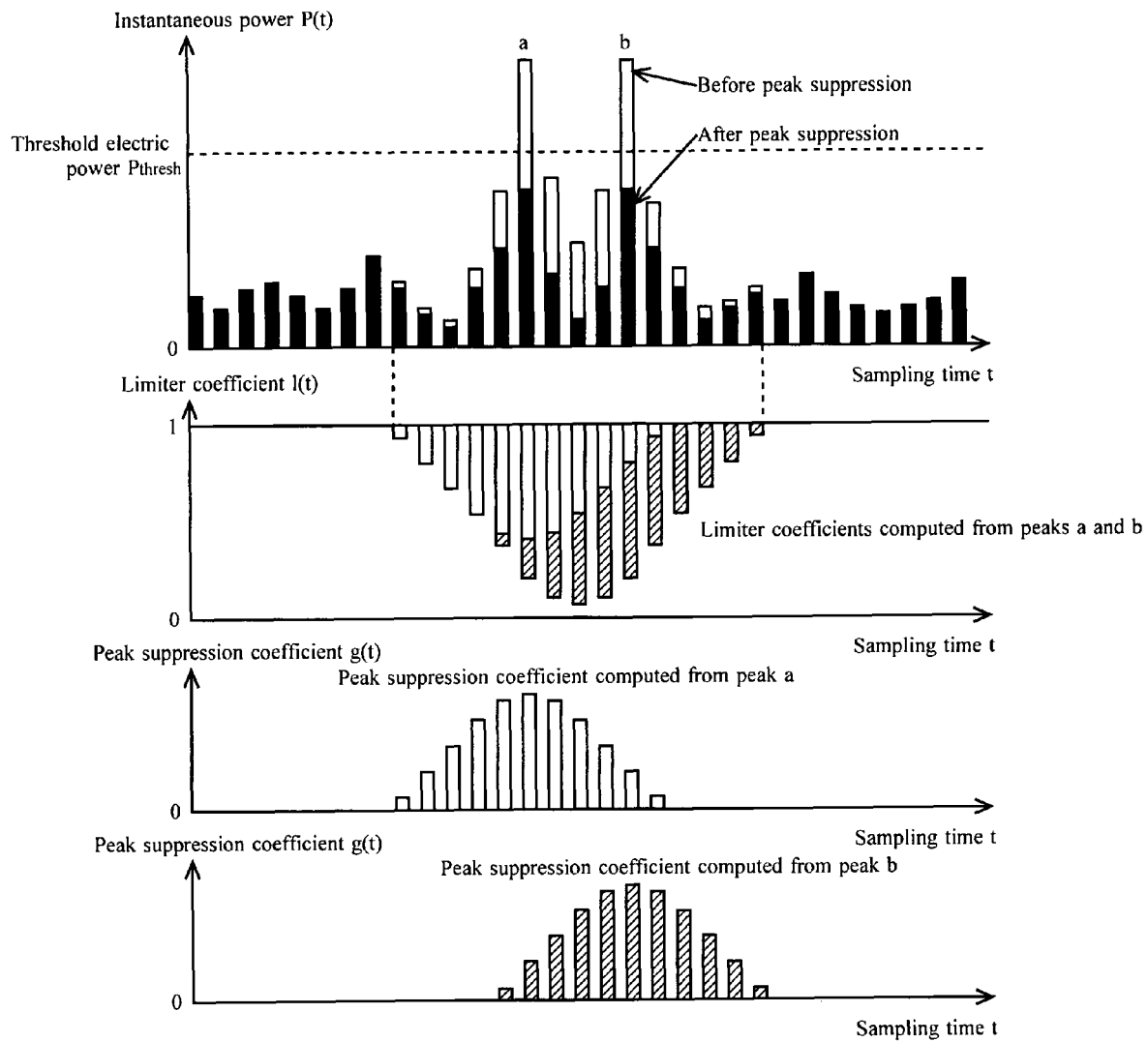
FIG. 10 shows diagrams depicting a manner of the suppression of peak electric power when a peak suppression ratio is not corrected.

For comparison with FIG. 9, FIG. 10 shows a manner of the suppression of peak electric power when the peak suppression ratio is not corrected by the transmitter according to the embodiment. This is virtually equal to the transmitter disclosed in Patent Reference 2.

As shown in FIG. 10, in the comparative example, the magnitude of the peak suppression coefficient computed from Peak a is the same as the magnitude of the peak suppression coefficient computed from Peak b as matched with Peak a and Peak b having the same instantaneous power, the instantaneous power of Peak a and Peak b is suppressed to the value that is greatly below the threshold electric power by limiter coefficients computed from two peak suppression coefficients.

Figure 11:
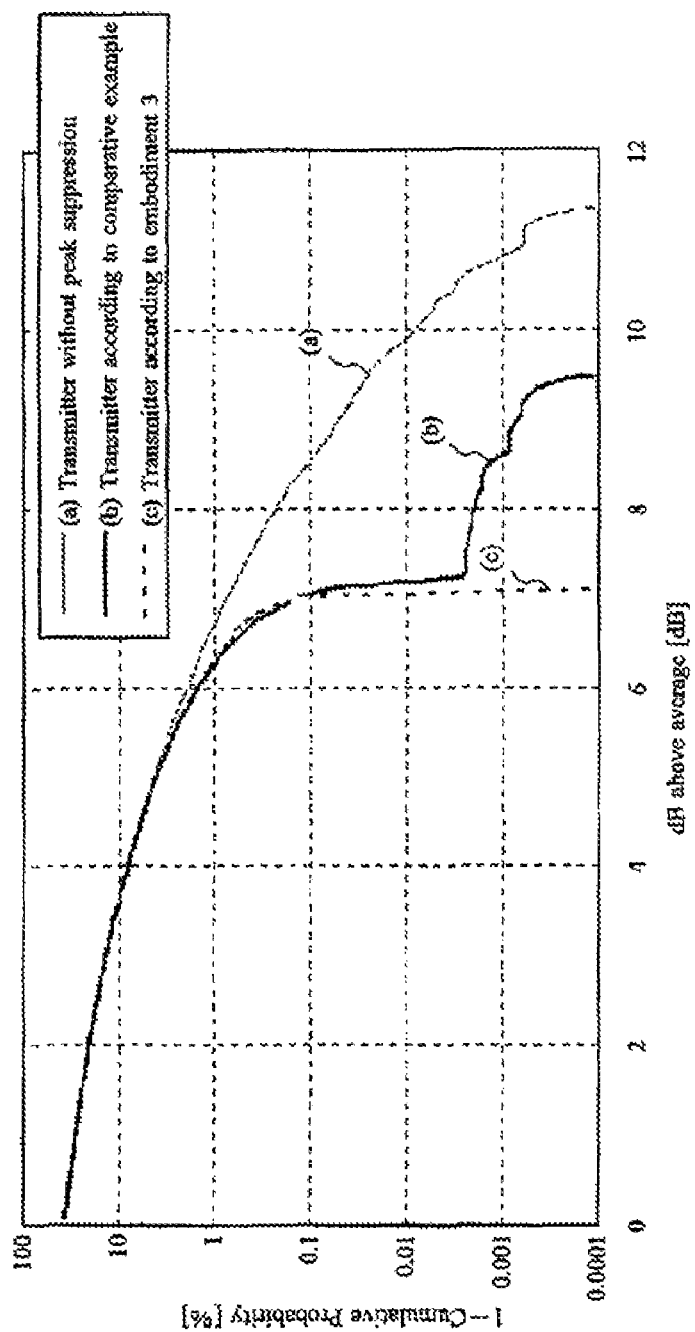
FIG. 11 shows a diagram depicting exemplary simulation results of the complementary cumulative distribution function (CCDF) of signals outputted from a transmitter before and the transmitter according to the third embodiment.

FIG. 11 shows exemplary simulation results of the complementary cumulative distribution function (CCDF) of signals outputted from transmitters adopting a W-CDMA communication system when a single carrier is transmitted, showing (a) an exemplary characteristic relating to a transmitter with no functionality of suppressing peak electric power, (b) an exemplary characteristic relating to a transmitter according to the comparative example equivalent to Patent Reference 2, and (c) an exemplary characteristic relating to the transmitter 1 according to the embodiment as shown in FIG. 1. Moreover, the horizontal axis shown in a graph in FIG. 11 indicates electric power [dB] by which the average electric power after peak electric power is exceeded is suppressed, and the vertical axis indicates the cumulative probability [%]. The simulation conditions are the same for all of (a) to (c) using the same signal sequence, and the value of (the average electric power+7 dB) is set as a threshold electric power. In addition, FIG. 11 does not always have the same conditions as those of FIG. 3.

As shown in FIG. 11, in (b), because of the influence that a transmission target signal is excessively reduced to drop average electric power at a sample time instant at which a plurality of the peak power reduction coefficients is overlapped with each other, the result of reduced peak electric power is relatively greater than the average electric power. In addition, in the case in which the peak suppression coefficients are overlapped with each other on the time base, because of the influence that as the degree of overlapping is greater, the peak electric power is reduced to the electric power below the threshold electric power to a large extent, variations in the result of reduced peak electric power are great, and CCDF does not drop steeply.

In (c), since the limiter coefficients are computed in consideration of overlapped peak suppression coefficients, the peak electric power is reduced to nearly constant electric power as the set threshold power.

As described above, in the embodiment 3, since the peak suppression ratio generating means generates the peak suppression ratio in accordance with the ratio between the transmission target signal level threshold (the transmission target signal level threshold for determining the peak of the signal to be a transmission target) and the level of the peak of the signal to be a transmission target, in order to reduce the peak of the signal to be a transmission target. The peak suppression ratio correcting means corrects the peak suppression ratio generated by the peak suppression ratio generating means depending on the degree with which the peak suppression coefficient that has been generated in the past is overlapped with the peak suppression coefficient that is newly generated. The peak suppression coefficient generating means generates the result obtained by weighting the corrected peak suppression ratio corrected by the peak suppression ratio correcting means by a predetermined window function as the peak suppression coefficient. The transmission target signal level suppression means suppresses the level of the signal to be a transmission target by the peak suppression coefficient generated by the peak suppression coefficient generating means.

Accordingly, when the peak suppression coefficient that is newly generated and the peak suppression coefficient that has been generated in the past are overlapped with each other on the time base, the peak suppression coefficient that is newly generated is made small depending on the degree of overlapping with the peak suppression coefficient that has been generated in the past. Therefore, the total sum of a plurality of the overlapped peak power reduction coefficients becomes a proper value, and the level of the signal to be a transmission target is not excessively suppressed. In other words, the degradation of EVM and PCDE can be suppressed. Moreover, a reduction in the average electric power is suppressed, whereby PAPR is improved, and the efficiency of the amplifier can be increased. Therefore, as compared with conventional manners, the suppression of the peak level can be performed effectively, that is, advantages for both the suppression of the peak level and a reduction in out-of-band power leakage.

Moreover, the embodiment is not limited to those for use along with the BB limiter, and is not limited to the application to the IF limiter. In addition, the number of the carriers is not limited to plural numbers, which may be a single carrier.

Here, for the configurations of the transmitter, the transmitting amplifier and so on according to the invention, the configurations are not limited to those described above, various configurations may be used. In addition, for example, the invention can be provided as a method or a mode which processes the process steps according to the invention, or a program which implements such a method and a mode, or a recording medium which records the program thereon. In addition, for example, the invention can be provided as various units and systems such as a communication unit, a radio communication apparatus, and a radio communication system.

In addition, the fields to which the invention is applied are not necessarily limited to the description above; the invention can be applied to various fields.

In addition, for various process steps performed in the transmitter, the transmitting amplifier and so on according to the invention, for example, such a configuration for control may be used in which a processor runs a control program stored in a ROM (Read Only Memory) in hardware resources having the processor, a memory, etc. In addition, for example, each of the functionality means for executing the process steps may be configured as a separate hardware circuit.

In addition, the invention can be understood as a computer readable recording medium such as a Floppy (trademark) disc and a CD (Compact Disc)-ROM in which the control program is stored, and the program (itself). The control program is inputted from the recording medium to a computer to allow a processor to run the program, whereby the process steps according to the invention can be executed.

INDUSTRIAL APPLICABILITY

As described above, the transmitter according to the invention, a peak reduction process is applied to digital signals to be a transmission target on a plurality of carriers in the baseband, a band limitation process is applied to the digital signals on each of the carriers to which the peak reduction process is applied, a quadrature modulation process is applied to the digital signals on each of the carriers to which the band limitation process is applied, the digital signals on each of the carriers to which the quadrature modulation process is applied are added, and a peak reduction process is applied to a signal of the added result in the intermediate frequency band. Therefore, for example, even in the case in which a new peak occurs due to band limitation performed in the subsequent stage of the peak reduction process in the baseband, the peak can be reduced in the intermediate frequency band. Accordingly, the peak that occurs in the transmitting signal can be effectively reduced, and communication quality can be made excellent.

The invention claimed is:

1. A transmitter which processes a signal to be a transmission target, the transmitter comprising:
baseband limiter means operable to apply a peak reduction process to digital signals to be transmitted by the transmitter on a plurality of carriers in a baseband;
band limiting filter means operable to apply a band limitation process to the digital signal on each of the carriers output from the baseband limiter means to which the peak reduction process is applied by the baseband limiter means;
quadrature modulation processing means operable to apply a quadrature modulation process to the digital signal on each of the carriers output from the band limiting filter means to which the band limiting process is applied by the band limiting the filter means;
adding means operable to add the digital signal on each of the carriers output from the quadrature modulation processing means to which the quadrature modulation process is applied by the quadrature modulation processing means; and
intermediate frequency limiter means operable to apply a peak reduction process to a signal that is a result of adding the digital signals by the adding means in an intermediate frequency band,
wherein the intermediate frequency limiter means comprises:
peak detecting means operable to detect a peak of a level of an input signal;
peak relating value generating means operable to generate (i) a value obtained by dividing a difference between the level of the peak detected by the peak detecting means and a predetermined threshold by the level of the peak, or (ii) a correction value of the value obtained by dividing the difference between the level of the peak detected by the peak detecting means and the predetermined threshold by the level of the peak;
level reduction coefficient generating means operable to generate a coefficient, based on the value, or the correction value, generated by the peak relating value generating means and a predetermined window function, for generating a level reduction signal;
level reduction signal generating means operable to generate a level reduction signal by multiplying the coefficient generated by the level reduction coefficient generating means by the input signal; and
level reduction signal subtraction means operable to subtract the level reduction signal generated by the level reduction signal generating means from the input signal to form an output signal from a subtracted result.

2. A transmitter which transmits a signal to be a transmission target, the transmitter comprising:
peak detecting means operable to compare a transmission target signal level threshold with a level of a transmission target signal to detect a peak of a transmission target signal;
peak suppression ratio generating means operable to generate a peak suppression ratio in accordance with the transmission target signal level threshold and a level of the peak detected by the peak detecting means;
peak suppression ratio correcting means operable to correct the peak suppression ratio, generated by the peak suppression ratio generating means, depending on a degree with which a peak suppression coefficient that has been previously generated overlaps a peak suppression coefficient that is newly generated;
peak suppression coefficient generating means operable to generate at least one peak suppression coefficient by weighting the corrected peak suppression ratio corrected by the peak suppression ratio correcting means by a predetermined window function; and
transmission target signal level suppression means operable to suppress the level of the transmission target signal by using the at least one peak power reduction coefficient generated by the peak suppression coefficient generating means.

3. The transmitter according to claim 2, wherein
the peak suppression ratio generating means generates the peak suppression ratio in accordance with a ratio of the transmission target signal level threshold to the level of the peak detected by the peak detecting means.

* * * * *